United States Patent [19]

Clay et al.

[11] 3,987,146

[45] Oct. 19, 1976

[54] SIMULTANEOUS REMOVAL OF NITROGEN OXIDES AND SULFUR OXIDES FROM COMBUSTION GASES

[75] Inventors: David T. Clay, Longview, Wash.; Scott Lynn, Walnut Creek, Calif.

[73] Assignee: The United States of America as represented by the United States Energy Research and Development Administration, Washington, D.C.

[22] Filed: Aug. 7, 1975

[21] Appl. No.: 602,708

[52] U.S. Cl. .............................. 423/239; 423/244; 423/561
[51] Int. Cl.² ............................................ B01D 53/34
[58] Field of Search ............ 423/239, 244, 351, 561

[56] References Cited
UNITED STATES PATENTS

| | | | |
|---|---|---|---|
| 2,189,250 | 2/1940 | Mezger et al. ...................... | 423/239 |
| 3,454,355 | 7/1969 | Ryason ................................ | 423/249 |
| 3,695,828 | 10/1972 | Gersten et al. ...................... | 423/239 |
| 3,795,730 | 3/1974 | Kalvinskas .......................... | 423/239 |
| 3,888,970 | 6/1975 | Haas et al. .......................... | 423/244 |
| 3,917,800 | 11/1975 | McGauley et al. .................. | 423/244 |

*Primary Examiner*—G. O. Peters
*Attorney, Agent, or Firm*—John A. Horan; Irene S. Croft

[57] ABSTRACT

A process for the simultaneous removal of sulfur oxides and nitrogen oxides from power plant stack gases comprising contacting the stack gases with a supported iron oxide catalyst/absorbent in the presence of sufficient reducing agent selected from the group consisting of carbon monoxide, hydrogen, and mixtures thereof, to provide a net reducing atmosphere in the $SO_x/NO_x$ removal zone. The sulfur oxides are removed by absorption substantially as iron sulfide, and nitrogen oxides are removed by catalytic reduction to nitrogen and ammonia. The spent iron oxide catalyst/absorbent is regenerated by oxidation and is recycled to the contacting zone. Sulfur dioxide is also produced during regeneration and can be utilized in the production of sulfuric acid and/or sulfur.

14 Claims, 3 Drawing Figures

SIMULTANEOUS REMOVAL OF NITROGEN OXIDES AND SULFUR OXIDES FROM COMBUSTION GASES

BACKGROUND OF THE INVENTION

The invention described herein was made in the course of, or under, Energy Research and Development Administration Contract No. W-7405-ENG-48 with the University of California. The work was supported in part by the Environmental Protection Agency and the National Science Foundation.

This invention relates to the removal of pollutants from effluent gases from stationary sources. More particularly, the invention relates to the simultaneous removal of $SO_x$ and $NO_x$ from effluent gases of fossil fuel burning power plants.

Emissions of nitric oxide and sulfur dioxide from stationary sources have been an increasing problem in the United States over the last several years. Assuming no controls, it is estimated that by the year 1980, power plants would emit about 65% of the total sulfur dioxide emissions and about 25% of total NO emissions. Although both of these pollutants are generated from the same source, separate control technology has heretofore been developed for each.

In December, 1971, the Environmental Protection Agency promulgated Standards of Performance for New Stationary Sources which included limits on the emissions of both $SO_x$ and $NO_x$ from power plants. This clearly identified the need to develop processes which controlled both $SO_2$ and NO emissions. A feasible process for the simultaneous removal of nitrogen oxides and sulfur oxides from the effluent gases of fossil-fuel burning power plants should meet the following criteria: (1) the process should have the potential of lowering the $NO_x$ and $SO_x$ concentrations to less than 100 parts per million; (2) no other type of pollution problem should be created by installation of the process; (3) the removal mechanism for one component should not depend upon the presence or absence of the other; (4) furnace operation should be independent of the process operation; (5) the process should be adaptable to both new and existing power plants, and (6) the economics should be an improvement over the best currently known processes.

The simultaneous reduction of nitric oxide and sulfur dioxide by carbon monoxide in the presence of a copper catalyst supported on alumina is known. (See C. W. Quinlan, V. C. Okay, J. R. Kittrell, "Simultaneous Catalytic Reduction of Nitric Oxide and Sulfur Dioxide by Carbon Monoxide", Ind. Eng. Chem. Process Des. Develop. 12 (3) 359, 1973.) In the aforementioned process elemental sulfur is formed by the direct reduction of the sulfur dioxide; however, the reaction of carbon monoxide and sulfur also produces carbonyl sulfide, a toxic and undesirable side product. The production of carbonyl sulfide is a major difficulty with this method. In order to obviate this problem, it has been proposed to utilize three catalyst beds operating at two different temperatures (see R. Querido, W. L. Short, "Removal of Sulfur Dioxide from Stack Gases by Catalytic Reduction to Elemental Sulfur with Carbon Monoxide", Ind. Eng. Chem. Process Des. Develop. 12 (1) 10, 1973). According to this proposal, the entire gas stream would pass through a first catalyst bed of copper oxide on alumina at about 485° C to remove oxygen, which poisons the catalyst, by conversion to $CO_2$. The exit stream would then be split, the major portion entering the second reactor containing Cu on alumina catalyst, also at 485° C. In the second reactor, $SO_2$ would be reduced to sulfur and COS. The effluent from the second reactor, along with the smaller split flow from the first reactor, would then be cooled to about 315° C passed into a third reactor also containing a Cu on alumina catalyst bed. In the third reactor, the COS formed in the second reactor would react with $SO_2$ to form sulfur.

The above-described prior art process, while it accomplishes the simultaneous removal of nitric oxide and sulfur dioxide, leaves much to be desired. First, three catalyst beds in series will create a large system pressure drop. Second, the bypass stream must be very accurately controlled to provide stoichiometric COS and $SO_2$. Third, the amount of CO required for the reduction must be closely controlled since only reactions with $O_2$, $SO_2$ and NO remove it. Fourth, the flue gas would have to be cooled and then reheated after the bed to insure complete precipitation of the sulfur. Fifth, failure in the performance of the first bed would result in $O_2$ poisoning the remaining two.

SUMMARY OF THE INVENTION

In accordance with the process of the present invention, the simultaneous removal of sulfur oxides and nitrogen oxides from diluent gases containing them, particularly from gases produced by the combustion of fossil fuels, is accomplished by contacting the gases with an iron oxide catalyst/absorbent, preferably supported on a particulate matrix such as a matrix of high surface alumina or a mixture of alumina and silica in the presence of a reducing agent selected from carbon monoxide, hydrogen, and mixtures thereof, in an amount sufficient to provide a net reducing atmosphere in the $SO_x/NO_x$ removal zone. The sulfur oxides are removed by absorption substantially as ferrous sulfide, and nitrogen oxides are removed by catalytic reduction to nitrogen or ammonia.

The terms $SO_x$ and $NO_x$ are used herein to denote the various possible oxides of sulfur and of nitrogen, respectively. The major component of the $SO_x$ effluent is generally $SO_2$, and the major component of the $NO_x$ effluent is generally NO.

It has been found that the use of iron oxide as a catalyst/absorbent suppresses the formation of the highly toxic gases COS and $H_2S$. It has also been found that the ferrous sulfide formed upon absorption of the sulfur oxide gases is an active catalyst for the reduction of nitrogen oxides. Additionally, the present process has the advantage of being able to tolerate the presence of oxygen in the contacting zone. Furthermore, the spent, sulfided catalyst is readily regenerable in the process by oxidation with an oxidizing gas to reoxidize the iron to ferric oxide which is then recycled to the contacting step. By maintaining an excess of ferric oxide in the catalyst/absorbent recycle stream the residual gaseous reducing agents in the effluent stack gas can be controlled in the present process.

According to a specific mode of operation, the reducing agent used is a $CO/H_2$ mixture produced by burning a fossil fuel, preferably the same fuel used in the power plant, in an oxygen-deficient atmosphere.

It is, therefore, an object of the present invention to provide an economically feasible process for the simultaneous removal of sulfur oxide and nitrogen oxide pollutants from combustion gases.

3

It is a particular object of this invention to provide a process for the simultaneous removal of sulfur oxides and nitrogen oxides from stack gases which minimizes the production of undesirable byproducts and which creates no other pollution problem.

Other objects of the invention will be apparent from the following detailed description made with reference to the accompanying drawing.

Figure 1:
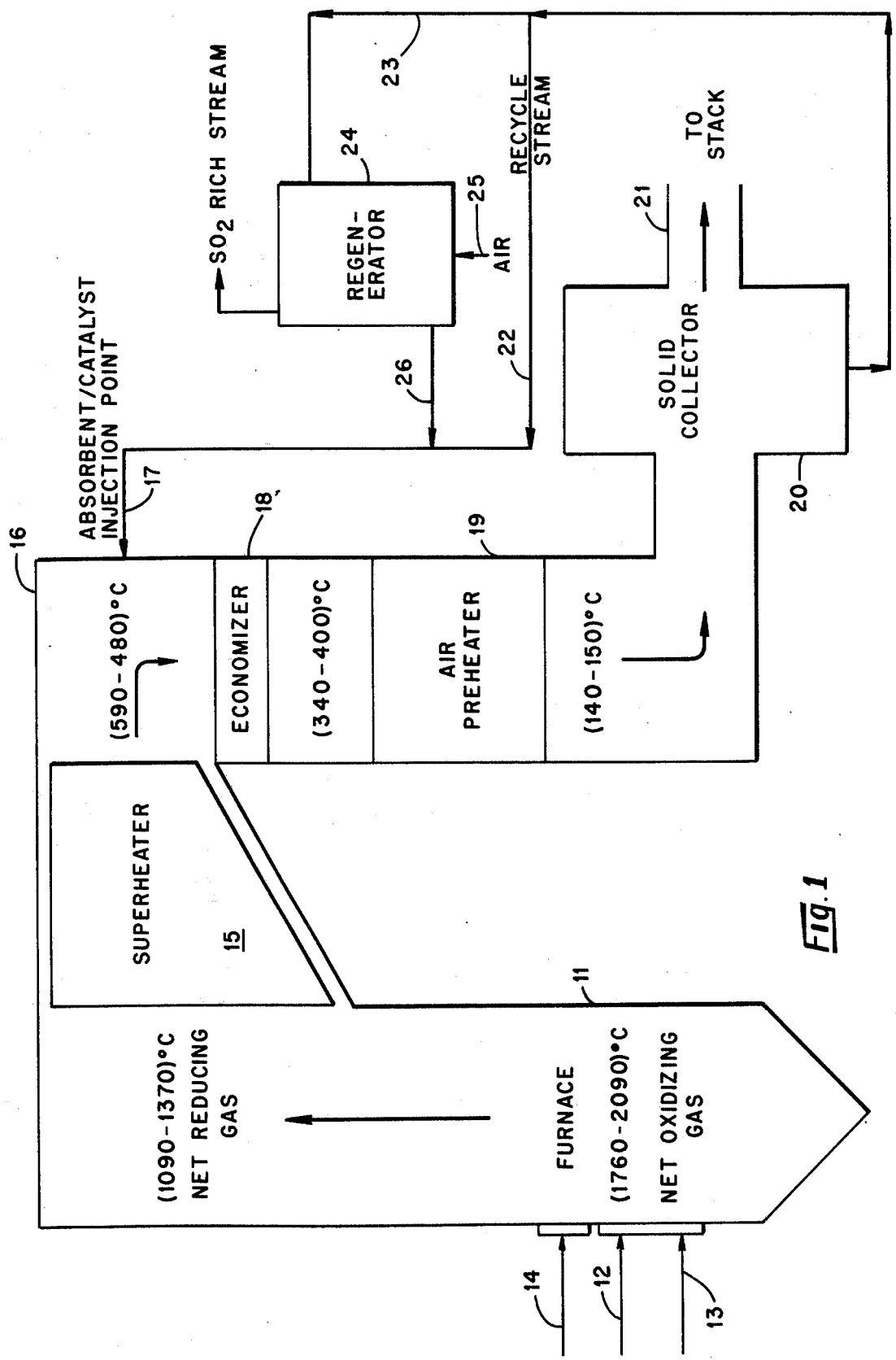
FIG. 1 is a process flow diagram illustrating a preferred mode of operation of the process of the present invention.

DETAILED DESCRIPTION OF THE INVENTION:

With reference to FIG. 1, numeral 11 represents a typical power plant boiler furnace. A fossil fuel and an oxidizing gas are fed to furnace 11 via lines 12 and 13, respectively. Maximum efficiency is achieved with the minimum net oxidizing atmosphere to completely oxidize the carbon to $CO_2$, hydrogen to $H_2O$ and sulfur to $SO_2$. The minimum required excess air over the stoichiometric amount will be a function of the burner design and the type of fuel used.

At a point in the upper part of furnace 11, for example, at the upper row of burners, a stream of a reducing gas comprising carbon monoxide, hydrogen, or a mixture thereof, is added via line 14, thereby producing a slightly fuel-rich flue gas at the furnace exit. The presence of $O_2$ in the gas leaving the furnace is not precluded but it is required that enough reducing agent be present so that at equilibrium all NO is converted to $N_2$, all $O_2$ to $CO_2$ or $H_2O$, and all $SO_2$ to sulfide.

The net reducing flue gas exits furnace 11 at a temperature in the range of from about 1090° to about 1370° C and enters superheater section 15 of the boiler. The flue gas, which exits superheater section 15 at a temperature in the range of from about 590° to about 480° C, is then contacted in contacting zone 16 with a dispersed phase of catalyst/absorbent particles introduced via line 17. The dispersed-phase method of contacting is preferred because it minimizes the system pressure drop. Contactor section 16 is preferably an extension of the duct between superheater section 15 and economizer section 18 of the boiler.

The flue gas/solids mixture then passes through economizer section 18, exiting at a temperature in the range of from about 340° C to about 400° C, and through air preheater section 19, exiting at a temperature in the range of from about 140° to about 150° C, to solids collector 20 where the solid particles are separated from the flue gas. The flue gases are removed by means of line 21 and a major portion of the collected solids are returned to contactor 16 by means of line 22 and line 17. Alternatively, the flue gas might be passed through a solids collection system immediately after the solids contacting system and before the economizer and preheated systems.

A slip-stream, line 23, diverts a portion of the catalyst/absorbent to regenerator 24. An oxidizing gas, preferably air, is added to regenerator 24 via line 25 to reoxidize the iron to ferric oxide and to produce an $SO_2$ stream suitable for conversion to concentrated sulfuric acid or elemental sulfur. Regenerated catalyst/absorbent is recycled to contactor 16 by means of lines 26 and 17.

The preferred reducing agent for use in the present invention is a mixture of CO and $H_2$ produced by burning a fossil fuel in an oxygen-deficient atmosphere. The fuel used to produce the $CO/H_2$ mixture is preferably the same as the fuel used in the power plant. For example, the $CO/H_2$ mixture can be generated in a moving-grate, coal-fueled stoker unit which is operated with a limited fuel supply. Typically, the $H_2/CO$ ratio obtained is from about 0.2 to about 0.4; therefore, the major reducing agent will be CO. Alternatively, a net-reducing flue gas might be produced by operating the furnace with a slightly fuel-rich ratio of coal to air.

The most suitable catalyst/absorbent for use in the present process is iron oxide, although the oxides of the related Group VIII metals, cobalt and nickel, may also be used. The catalyst is preferably supported on a particulate matrix. The matrix used should not decrease the solids activity for NO and $SO_2$ removal. Suitable matrices include high surface alumina and alumina-silica mixtures. A typical catalyst/absorbent consists of about 15 – 25% ferric oxide supported on alumina or alumina-silica. The ferric oxide catalyst is reduced by contact with the net reducing flue gas; the presence of reduced iron oxide is necessary both for the absorption of sulfur compounds and for the prevention of rapid catalyst deactivation.

The preferred temperature range for the $NO_x$ and $SO_x$ removal reactions is from about 370° C to about 540° C, with the upper level being the recommened temperature of operation. At the upper temperature level, catalyst deactivation due to sulfate formation is inhibited, reaction kinetics is more rapid, and large differences between the temperature for removal and that for regeneration are avoided. In a typical power plant system, the flue gas exits the superheater at a temperature in the range of from about 480° C to about 590° C, with the temperature at the economizer inlet being about 540° C and the temperature at the air preheater inlet being about 370° C. Thus, the point in the system between the superheater and the economizer provides optimum temperature conditions for removal of $NO_x$ and $SO_x$, and the catalyst/absorbent is advantageously injected at this point.

For a dispersed-bed contactor the residence time normally available at the desired temperature range will vary with the unit. For low solid densities, higher residence times are required. It is calculated that about 90% removal can be achieved in 1 second with low solids density. The actual amount of removal for a given residence time can be controlled by the solids density within the contactor.

In the regeneration zone, sulfided catalyst, together with any iron sulfate and reduced iron oxide, is converted substantially completely to ferric oxide by oxidation with an oxidizing gas, preferably air. The preferred regeneration temperature is in the range of from about 650° C to about 760° C. The temperature level attained is a function of the solid composition and the heat either removed or added to the system. One of the advantages of the present process is that regeneration of the catalyst involves exothermic reactions which can provide sufficient heat to maintain the desired temperature in the regenerator. Exothermic reactions are the oxidation of FeS to $SO_2$ and $Fe_2O_3$ and the oxidation of FeO to $Fe_2O_3$; the decomposition of any $FeSO_4$ formed in the removal process and heating requirements for the solids and air are endothermic loads. Given the limits for $FeSO_4$ and $Fe_2O_3$ in the removal step, the minimum amount of FeS necessary to provide a net exothermic reaction in the regenerator can be calculated from an energy balance. Preferably, the amount of FeS present should be substantially higher than the minimum to provide for system fluctuations. Any excess heat generated can be removed in another part of the process or in the power plant. In order to insure complete regeneration of the catalyst/absorbent a solids hold-up time of from about 300 seconds to about 100 seconds is preferred when air is used as the regeneration gas.

One set of equations describing the overall process reactions, using the preferred $CO/H_2$ mixture as the reducing agent, is as follows:

ABSORPTION/REDUCTION STEP

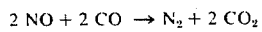
$2\,NO + 2\,CO \rightarrow N_2 + 2\,CO_2$

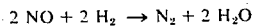
$2\,NO + 2\,H_2 \rightarrow N_2 + 2\,H_2O$

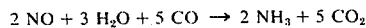
$2\,NO + 3\,H_2O + 5\,CO \rightarrow 2\,NH_3 + 5\,CO_2$

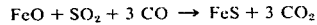
$FeO + SO_2 + 3\,CO \rightarrow FeS + 3\,CO_2$

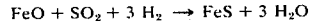
$FeO + SO_2 + 3\,H_2 \rightarrow FeS + 3\,H_2O$

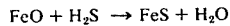
$FeO + H_2S \rightarrow FeS + H_2O$

$FeO + COS \rightarrow FeS + CO_2$

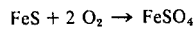
$FeS + 2\,O_2 \rightarrow FeSO_4$

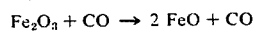
$Fe_2O_3 + CO \rightarrow 2\,FeO + CO$

$Fe_2O_3 + H_2 \rightarrow 2\,FeO + H_2O$

REGENERATION STEP

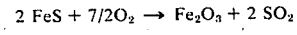
$2\,FeS + 7/2\,O_2 \rightarrow Fe_2O_3 + 2\,SO_2$

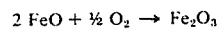
$2\,FeO + \frac{1}{2}\,O_2 \rightarrow Fe_2O_3$

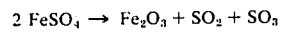
$2\,FeSO_4 \rightarrow Fe_2O_3 + SO_2 + SO_3$

The important consideration for the gas composition in the contacting zone is that it be at least net reducing. This means that the ratio $$\left(\frac{O}{R}\right)_{N_2} = \frac{2[O_2] + [NO] + 3[SO_2]}{[CO] + [H_2]}$$

where $(O/R)_{N_2}$ represents the ratio of oxidizing equivalents to reducing equivalents with reference to the reduction of NO to $N_2$, should be equal to or less than 1. Values greater than 1 may result in eventual catalyst deactivation. Catalyst deactivation for NO removal and absorption deactivation for $SO_2$ removal result from the formation of metal sulfate in the catalyst/absorbent, probably due to the formation of a metal sulfate layer around the unreacted core of metal oxide. Iron sulfate results if some $O_2$ is present due to incomplete mixing, in the flue gas at the point of catalyst/absorbent addition. In the present process, using an iron oxide catalyst, it was found that for active catalyst/absorbent, the sulfate level could reach as much as about 15% of the total sulfur reacted without seriously interfering with NO removal. In these tests the $O_2$ level was 1%.

It was also found that the iron sulfide, formed by the reaction of the sulfur compounds with reduced iron oxide, acts as a catalyst for the reduction of NO with $H_2$ or CO. NO is the major component (about 90 – 95%) of the $NO_x$ effluent in flue gas. In the high-temperature net-reducing atmosphere of the contacting zone essentially all of the $NO_x$ will be NO.

Experimental runs were conducted to investigate the catalytic ability of iron sulfide for the reduction of NO. The runs were made by passing a gas stream containing NO through a fixed bed, flow-through, stainless steel, 32-mm I. D. reactor housed in a Burrell Tube Furnace. A 44.4-mm I. D. Mullite tube surrounded the reactor. The catalyst used was pre-reduced and sulfided 3.2-mm $Fe/Al_2O_3$ pellets (Harshaw Fe-301-T1/8). The reaction conditions and results are summarized in Table I. In Run 1, NO was reduced with $H_2$ over iron sulfide; in Run 2, NO was reduced with CO and $H_2O$ over iron sulfide.

TABLE I

| Run | T(°C) | θ (sec) | [NO] % | [H₂] % | [CO] % | H₂O % | Solid (Initial) | % NO Removal |
|---|---|---|---|---|---|---|---|---|
| 1 | 372 | 0.51 | 0.33 | 0.43 | | | $FeO_{.14}S_{.60}$ | 100 |
| 2 | 374 | 0.49 | 0.58 | | 1.1 | 3.4 | $FeO_{.27}S_{.97}$ | 100 |

θ = Residence time of gas in contactor.

When either $H_2$ of $H_2O$ is present, both $N_2$ and $NH_3$ are the products of NO reduction.

It is evident from the results given in the above table that, in the present process for simultaneous removal of sulfur oxides and nitrogen oxides, sulfiding of the iron oxide catalyst does not interfere with NO removal but, in fact, the resulting iron sulfide acts as a catalyst for the reduction of NO by either $H_2$ or CO. It was also found that sulfiding the catalyst improved its activity for NO reduction by CO. This was demonstrated by experimental runs 3 and 4.

Experimental runs 3 and 4 were conducted as described above with respect to runs 1 and 2. Reaction conditions are summarized in Table II.

TABLE II

| Run | T(°C) | θ(sec) | [NO] % | [CO] % | $FeO_xS_y$ (Avg) |
|---|---|---|---|---|---|
| 3 | 356 | 0.38 | 1.8 | 0.80 | x = .10, y = 1.1 |
| 4 | 379 | 0.41 | 0.89 | 1.02 | x = .63, y = .63 |

θ = Residence time of gas in contactor

Figure 2:
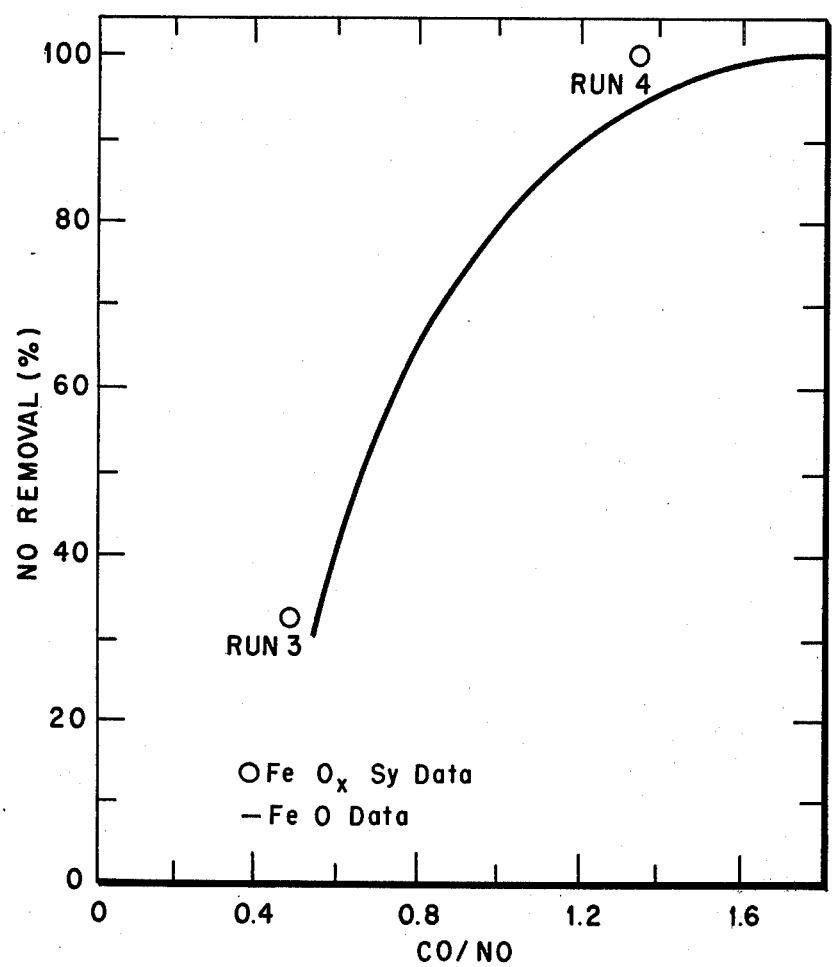
FIG. 2 is a graph of NO removal versus CO/NO for FeO and for $FeO_xS_y$.

The percent NO removal versus CO/NO for the sulfided catalyst of Runs 3 and 4 is compared with previously obtained data for FeO in the graph of FIG. 2. It is evident from the graph that, for both low and high CO/NO ratios, runs 3 and 4 using a sulfided catalyst are substantially above the correlation line for the FeO data.

Additionally, iron sulfide was found to be capable of reducing NO in the presence of $H_2O$, regardless of the reducing agent present in the gas phase, over a much longer time period than FeO. This was demonstrated in experimental runs 5 and 6 which were conducted with the equipment and catalyst as described for Runs 1 and 2. Reaction conditions are summarized in Table III.

TABLE III

| Run | T(°C) | θ (sec) | [NO] % | [H₂O] % | Solid (Initial) | Solid (Final) |
|---|---|---|---|---|---|---|
| 5 | 372 | 0.4 | 0.45 | 1.3 | $FeO_{1.13}$ | $FeO_{1.26}$ |
| 6 | 372 | 0.45 | 0.47 | 1.5–2.5 | $FeO_{.5}S_{.76}$ | $FeO_{1.23}S_{.14}$ |

θ = Residence time of gas in contactor

Figure 3:
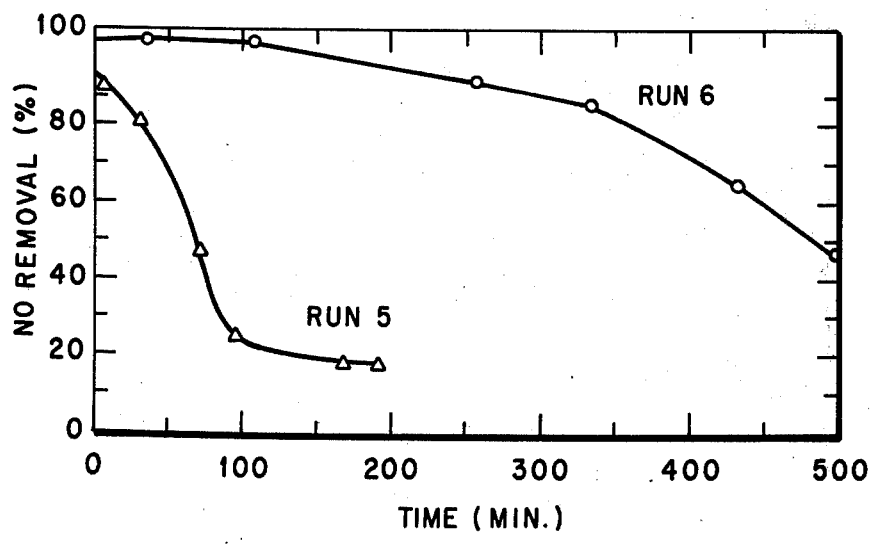
FIG. 3 is a graph of NO removal versus time for the reaction of $NO+H_2O$ with iron oxide and with iron sulfide.

The percent NO removal versus time for Runs 5 and 6 is given in the graph of FIG. 3. With FeO, percent removal dropped off to about 20% in 100 minutes and then leveled off, whereas, with iron sulfide, NO removal did not drop off until after 100 minutes and about 90% removal was still being achieved at about 300 minutes.

As hereinabove stated, it is necessary that the gas composition in the contacting zone be at least net reducing. When water or hydrogen is present, both $N_2$ and $NH_3$ are produced in the reduction of NO. Both the solid composition and the gas composition are important variables in determining $NH_3$ selectivity, that is, the percent reduced nitrogen compounds formed from NO in the form of $NH_3$. To have a low $NH_3$ selectivity requires high oxygen levels in both the solid and the gas; however, this requirement is counter to the requirements for effective NO and $SO_2$ removal. The balance of these variable is a minimum $NH_3$ selectivity of about 50%. Ammonia emitted by the process is well below allowable levels and is not considered to be an environmental detriment.

When a source of hydrogen is available, the system should preferably be net reducing with respect to $NH_3$ formation to prevent sulfur compounds from being stripped from the catalyst/absorbent. This means that the ratio $$\left(\frac{O}{R}\right)NH_3 = \frac{2.5[NO] + 3[SO_2] + 2[O_2]}{[H_2] + [CO]}$$

should be less than or equal to 1.

The most suitable solid composition in the contacting zone is determined by the removal and regeneration processes. As stated above, the formation of sulfate deactivates the catalyst for NO removal, but in the present process a sulfate level of as much as 15% of the total sulfur reacted can be tolerated. The present process also provides for the removal of excess CO and $H_2$ from the effluent gases by the maintenance of excess $Fe_2O_3$ in the catalyst/absorbent, preferably in an amount of about 110% of the stoichiometric requirement for reaction with the excess CO and $H_2$.

The level of sulfide in the solid is also important from the standpoint of regeneration. As explained above, it is preferred to maintain an amount of FeS in the solid sufficient to provide a net exothermic reaction in the regeneration zone.

A major advantage of the present process is that the iron oxide catalyst/absorbent can remove the reduced sulfur species, $H_2S$ and COS, which might form in the process. As shown by the above reactions, $H_2S$ and COS, both of which are highly toxic and undesirable side products, react directly with reduced iron oxide to form ferrous sulfide. The production of COS in particular has been a major drawback of prior art processes.

Experimental runs were conducted to compare the abilities of an iron oxide catalyst/absorbent and a copper oxide catalyst/absorbent for the simultaneous removal of $SO_2$ as a sulfide and NO as $N_2$ and $NH_3$. The runs were made by passing a gas stream containing NO and $SO_2$ through a fixed bed, flow-through, stainless steel, 32-mm I. D. reactor housed in a Burrell Tube Furnace. A 44.4-mm I. D. Mullite tube surrounded the reactor. In Run 7, the catalyst used was 3.2-mm Fe/$Al_2O_3$ catalyst/absorbent pellets (Harshaw Fe-301-T1/8). The catalyst was pre-reduced with CO. In Run 8, the catalyst used was Harshaw CuO803T1/8 which has 10% CuO deposited on activated $Al_2O_3$. The 3.2-mm pellet size was used. The catalyst was first reduced with CO to $CuO_{0.15}$. Reaction conditions are summarized in Table IV.

TABLE IV

| Run | T(°C) | θ (sec) | [NO] % | [O₂] % | [SO₂] % | [CO] % | [H₂O] % | Solid Initial | Solid Final |
|---|---|---|---|---|---|---|---|---|---|
| 7 | 538 | 0.34 | 0.50 | 0.49 | 0.48 | 3.7 | 1.8 | $FeO_{1.17}$ | $FeS_{0.96}$ |
| 8 | 538 | 0.33 | 0.50 | 0.50 | 0.50 | 4.2 | 1.9 | $CuO_{.15}$ | $CuS_{.59}$ |

θ = Residence time of gas in contactor

It was found that both catalysts effectively removed NO. However, the iron oxide catalyst/absorbent of Run 7 was found to be much more effective for the removal of sulfur compounds. During the first 90 minutes of Run 7, no sulfur compounds were eluted. During the first 40 minutes of Run 8, using the copper oxide catalyst, sulfur removal dropped off from about 90% to about 70% with COS being eluted. It is evident from the foregoing results that iron oxide is unexpectedly superior to copper oxide in suppressing the formation of COS.

The following example is illustrative of the process of the present invention.

EXAMPLE $2.736 \times 10^2$ Tph (Tons per hour) of coal is charged to a furnace and burned with air under oxidizing conditions. Air is introduced to the furnace at the rate of $20.84 \times 10^4$ lbmph (pound moles per hour). $2.455 \times 10^4$ lbmph of a reducing gas containing $73.75 \times 10^2$ lbmph of CO and $29.17 \times 10^2$ lbmph of $H_2$ is produced by burning $0.6129 \times 10^2$ Tph of coal with $1.741 \times 10^4$ lbmph of air. The reducing gas at 1100°C is introduced into the furnace at the upper row of burners. The combined exiting furnace flue gas is contacted, at a point in the system between the superheater and the economizer, with $14.32 \times 10^2$ Tph of a catalyst/absorbent which is a mixture of recycled solids, regenerated solids and a minor amount of fresh catalyst/absorbent and which consists of 14.42 × 10² lbmph FeS, 33.97 × 10² lbmph FeO, 10.38 × 10² lbmph $Fe_2O_3$, 2.545 × 10² lbmph $FeSO_4$ and 224.7 × 10² lbmph $Al_2O_3$. The temperature in the contacting zone is 370° – 538° C. The resulting gas/solids mixture is passed through cyclone separators. The separated gases are passed through an economizer, an air preheater, and an electrostatic precipitator for separation of fly ash, and then through the stack. Of the separated solids, 10.74 × 10² Tph is recycled to the contacting zone 3.579 × 10² Tph is diverted to a regeneration zone. In the regeneration zone, which is a series of ten fluidized beds stacked vertically, the diverted catalyst/absorbent is contacted with 0.5888 × 10⁴ lbmph of air at a temperature of about 677° C to reoxidize the iron to $Fe_2O_3$. The regenerated catalyst/absorbent is added to the recycle stream. A minor amount (0.000716 × 10² Tph) of fresh catalyst (20% ferric oxide supported on alumina) is also added.

The gas compositions at the contactor entrance and at the contactor exit are given in Table V.

TABLE V

| | Contactor Entrance | Contactor Exit |
|---|---|---|
| $N_2$ (%) | 73.44 | 73.86 |
| $CO_2$ (%) | 15.95 | 17.02 |
| $H_2O$ (%) | 8.98 | 9.02 |
| $O_2$ (ppm) | 819 | 0 |
| NO (ppm) | 721 | 72.5 |
| $SO_2$ (ppm) | 2247 | 265 |
| CO (ppm) | 9900 | 82.6 |
| $H_2$ (ppm) | 2247 | 183 |
| $NH_3$ (ppm) | 0 | 326 |
| (O/R)$NH_3$ | 0.93 | — |

The present invention provides an economical and efficient process for the simultaneous removal of $SO_x$ and $NO_x$ pollutants, generally in concentrations greater than about 100 parts per million, from combustion gases, particularly gases resulting from the combustion of fossil fuels in power plants. The present process is especially applicable to pulverized coal or oil fueled units with front fired or tangentially fired furnaces.

Although the invention hereinbefore described and illustrated in the accompanying drawing has been discussed with respect to specific steps of the method thereof, it will be appreciated that various modifications and changes may be made therein without departing from the true spirit and scope of the invention. Thus, it is not intended to limit the invention except by the terms of the following claims.

What we claim is:

1. A dry solids process for the simultaneous removal of $SO_x$ and $NO_x$ from diluent gases containing them wherein $So_x$ is removed by absorption substantially as a sulfide and $NO_x$ is removed by reduction which comprises:
   a. contacting the diluent gases in an $SO_x$ and $NO_x$ removal zone with a solid catalyst/absorbent comprising partially reduced iron oxide and ferric oxide at a temperature of at least about 370° C in the presence of an amount of a reducing agent selected from carbon monoxide, hydrogen, and a mixture thereof sufficient to provide a net reducing atmosphere in the $SO_x$ and $NO_x$ removal zone, thereby removing $SO_x$ by absorption on the catalyst/absorbent substantially as ferrous sulfide and removing $NO_x$ by reduction; and
   b. separating the resulting ferrous sulfide containing catalyst/absorbent from the diluent gases reduced in $SO_x$ and $NO_x$ content.

2. A process according to claim 1 further defined by maintaining an amount of ferric oxide in the catalyst/absorbent at least sufficient to oxidize the excess reducing agent.

3. A process according to claim 1 wherein the catalyst/absorbent is supported on a particulate matrix.

4. A process according to claim 3 wherein the particulate matrix is a substance selected from alumina and a mixture of alumina and silica.

5. A process according to claim 1 wherein the reducing agent is a mixture comprising carbon monoxide and hydrogen.

6. A process according to claim 1 wherein $SO_x$ is $SO_2$, $NO_x$ is NO, and the gases containing them are effluent gases produced by combustion of a fossil fuel.

7. A process according to claim 1 wherein the temperature in the $SO_x$ and $NO_x$ removal zone is in the range of from about 370° C to about 540° C.

8. A process according to claim 1 further defined by contacting at least a portion of the separated ferrous sulfide containing catalyst/absorbent with an oxidizing gas in a regeneration zone at a temperature of at least about 650° C, thereby regenerating the catalyst/absorbent by conversion of the iron compounds contained therein substantially to ferric oxide, and recycling the regenerated catalyst/absorbent to the $SO_x$ and $NO_x$ removal zone.

9. A process according to claim 8 wherein the oxidizing gas is air.

10. A process according to claim 8 wherein the temperature in the regeneration zone is in the range of from about 650° C to about 760° C.

11. A process according to claim 8 further defined by maintaining an amount of ferric oxide in the catalyst/absorbent at least sufficient to oxidize the excess reducing agent.

12. A dry solids process for the simultaneous removal of $SO_x$ and $NO_x$ from diluent gases containing them to provide a gas suitable for discharge into the atmosphere and wherein $SO_x$ is removed substantially as a sulfide and $NO_x$ is removed by reduction, which process comprises:
   a. contacting the diluent gases in an $SO_x$ and $NO_x$ removal zone with a dispersed bed of a solid catalyst/absorbent comprising partially reduced iron oxide and ferric oxide supported on a particulate matrix at a temperature of at least about 370° C in the presence of a reducing agent selected from carbon monoxide, hydrogen, and mixtures thereof in an amount sufficient to provide a net reducing atmosphere in said removal zone, thereby simultaneously removing from said diluent gases $SO_x$ by absorption on the catalyst/absorbent substantially as ferrous sulfide and $NO_x$ by reduction;
   b. separating the resulting ferrous sulfide containing catalyst/absorbent from the diluent gases reduced in $SO_x$ and $NO_x$ content;
   c. recycling a first portion of the separated ferrous sulfide containing catalyst/absorbent to the $SO_x$ and $NO_x$ removal zone;
   d. contacting a second portion of the separated ferrous sulfide containing catalyst/absorbent with an oxidizing gas in a regeneration zone at a temperature of at least about 650° C, thereby converting the iron compounds contained therein to ferric oxide;

e. recycling regenerated catalyst/absorbent from step (d) to the $SO_x$ and $NO_x$ removal zone; and f. maintaining an amount of ferric oxide in the catalyst/absorbent recycle stream at least sufficient to oxidize excess reducing agent in the $SO_x$ and $NO_x$ removal zone.

13. A process according to claim 12 wherein the temperature in the $SO_x$ and $NO_x$ removal zone is in the range of from about 370° C to about 540° C and the temperature in the regeneration zone is in the range of from about 650° C to about 760° C.

14. A process according to claim 12 further defined by maintaining an amount of ferrous sulfide in the catalyst/absorbent in the $SO_x$ and $NO_x$ removal zone to provide a net exothermic reaction in the subsequent regeneration step.

* * * * *